United States Patent [19]

Mizuno et al.

[11] 4,085,086

[45] Apr. 18, 1978

[54] PROCESS FOR PREPARING FLAME RETARDANT THERMOPLASTIC POLYESTERS

[75] Inventors: Shioji Mizuno, Osaka; Ryoichi Ishikawa, Izumi-ohtsu; Mitsumasa Miyazaki, Sakai, all of Japan

[73] Assignee: Dainippon Ink and Chemicals, Inc., Tokyo, Japan

[21] Appl. No.: 607,890

[22] Filed: Aug. 26, 1975

[51] Int. Cl.$^2$ .................. C08G 63/76; C08K 3/40
[52] U.S. Cl. .................. 260/40 TN; 260/75 NK
[58] Field of Search ...... 260/2.5 AN, 47 EQ, 75 NK, 260/77.5 AN, DIG. 24, 40 TN

[56] References Cited

U.S. PATENT DOCUMENTS

| | | | |
|---|---|---|---|
| 2,762,789 | 9/1956 | Fisher et al. | 260/75 R |
| 2,843,568 | 7/1958 | Benning et al. | 260/47 EQ X |
| 3,403,132 | 9/1968 | Waller | 260/77.5 AN X |
| 3,639,655 | 2/1972 | Jones | 260/75 NK X |
| 3,676,376 | 7/1972 | Svoboda et al. | 260/75 NK X |
| 3,787,526 | 1/1974 | Burns et al. | 260/47 EQ X |
| 3,887,523 | 6/1975 | Yau et al. | 260/DIG. 24 |
| 3,935,166 | 1/1976 | Kanai et al. | 260/75 NK X |

*Primary Examiner*—Sandra M. Person
*Attorney, Agent, or Firm*—Sherman & Shalloway

[57] ABSTRACT

A process for preparing a flame retardant thermoplastic polyester which comprises reacting a low molecular weight polyester having terminal hydroxyl groups with a polyfunctional isocyanate, said low molecular weight polyester being one synthesized using as its acid component a compound selected from the group consisting of terephthalic acid and its lower alkyl esters of 1–4 carbon atoms and as its alcohol component 1,4-butanediol and a compound selected from the group consisting of an alkylene oxide adduct of 2 – 4 carbon atoms of tetrabromobisphenol A and an alkylene oxide adduct of 2 – 4 carbon atoms of tetrachlorobisphenol A.

12 Claims, No Drawings

PROCESS FOR PREPARING FLAME RETARDANT THERMOPLASTIC POLYESTERS

This invention relates to a process for preparing polyesters which are not only flame retardant but thermoplastic as well.

Polybutylene terephthalate has been recently attracting attention as a molding resin (see, for example, U.S. Pat. No. 3,814,725). However, numerous technical problems are involved in converting such a resin into high polymers, such as the requirement for a special reaction vessel for high viscosity resin use as well as the necessity for creating a high vacuum in the reaction system.

Another problem in the case of this resin is its inadequate flame retardancy. For solving this deficiency, the practice hitherto has been to add and disperse uniformly a suitable flame retarding agent in the resin (see, for example, U.S. Pat. No. 3,751,396). However, no flame retarding agent has yet to be found which satisfies such conditions as (1) that great flame retardant effects are had even when the amount added of the flame retarding agent is small; (2) that a satisfactory compatibility exists between the flame retarding agent and the resin; (3) that a decline does not take place in the physical properties of the resin as a result of the addition of the flame retarding agent; and (4) that the flame retarding agent does not decompose during the steps of processing the resin.

The object of this invention is therefore to provide a thermoplastic resin excelling in flame retardance and suitable for molding use.

We found that the foregoing object of the invention could be achieved by reacting a low molecular weight polybutylene terephthalate with a polyfunctional isocyanate with the proviso that the former is one that has been obtained by using as one of its alcohol components a monomer that imparts flame retardancy to the polymer.

Thus, there is provided in accordance with this invention a process for preparing a flame retardant thermoplastic polyester which comprises reacting a hydroxylterminated low molecular weight polyester with a polyfunctional isocyanate, said low molecular weight polyester being one that has been synthesized by using as its acid component terephthalic acid or its lower alkyl ester of 1-4 carbon atoms and as its alcohol component 1,4-butanediol and either and alkylene oxide adduct of 2 - 4 carbon atoms of tetrabromobisphenol A or an alkylene oxide adduct of 2 - 4 carbon atoms of tetrachlorobisphenol A.

The hydroxyl-terminated low molecular weight polyester of this invention, which has been synthesized from terephthalic acid or its lower alkyl ester of 1 - 4 carbon atoms, 1,4-butanediol, and either an alkylene oxide adduct of 2 - 4 carbon atoms of tetrabromobisphenol A or an alkylene oxide adduct of 2 - 4 carbon atoms of tetrachlorobisphenol A, (hereinafter referred to as "low molecular weight modified polybutylene terephthalate") has an exceedingly low melt viscosity. Hence, in its preparation, there is no need for a reaction vessel for high viscosity resin use or an apparatus for creating a high vacuum in the reaction system, which are usually required in the preparation of high molecular weight polybutylene terephthalate. Thus, it is possible to fully carry out the synthesis with an exceedingly simple stirrer-equipped low vacuum reaction vessel.

Specifically, the synthesis can be carried out, for example, by a very simple procedure consisting of placing dimethyl terephthalate, tetrabromobisphenol A and 1,4-butanediol in a low vacuum reaction vessel, carrying out the ester interchange at 130°- 260° C. in the presence of a catalyst and thereafter effecting the polycondensation of the reaction mixture in a low vacuum.

A low molecular weight modified polybutylene terephthalate whose hydroxyl value (number of mg of potassium hydroxide equivalent to the hydroxyl groups contained in one gram of resin) is 5 - 40, acid value (number of mg of potassium hydroxide equivalent to the carboxyl groups contained in one gram of resin) is not greater than 10, and in which the acid value is not greater than one-third of the hydroxyl value is conveniently used in this invention. Especially, a low molecular weight modified polybutylene having little, if any, terminal carboxyl groups and whose both ends are occupied by hydroxyl groups is most conveniently used in this invention. This low molecular weight modified polybutylene terephthalate usually has a number average molecular weight of 2240 - 14,000, and preferably 5000 - 10,000. Such a low molecular weight modified polybutylene terephthalate has the following general formula

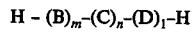

wherein B is

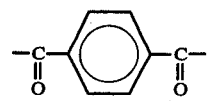

or

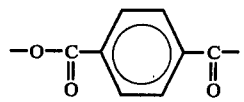

when it is situated at the terminal ends of the polymer, with the limitation that there is no direct linkage of two B's; C is $-O-C_4H_8-O-$, with the limitation that there is no direct linkage of two C's and, moreover, there is no direct linakge of C and D, D is

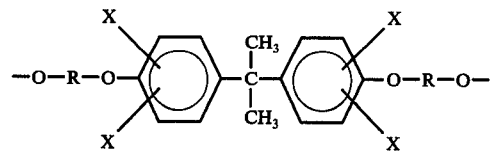

with the limitation that there is no direct linkage of two D's and, moreover, there is no direct linkage of D and C; R is either ethylene, propylene, isopropylene or butylene, X is either Cl or Br, with the proviso that when X is Cl, $m$ is 3.62 - 52.2, $n$ is 0.510 - 51.0, and $l$ is 0.345 - 26.3; and when X is Br, $m$ is 5.86 - 53.8, $n$ is 4.82 - 53.7, and $l$ is 0.152 - 8.93.

Conveniently usable in this invention as the low molecular weight modified polybutylene terephthalate is that having hydroxyl groups at both of its ends, i.e., a polyester of the formula HO—(polyester)—OH or a mixture of this polyester with that having the carboxyl group at one of its two ends, i.e., a polyester of the formula HOOC(polyester)OH. That having carboxyl groups at its both ends, i.e., a polyester of the formula HOOC(polyester)COOH is not desirable for use as the low molecular weight modified polybutylene terephthalate in this invention, because it reacts with the polyfunctional isocyanates at a relatively slow rate to generate carbon dioxide which remains in the obtained polymer.

In general, the polybutylene terephthalates of high molecular weight having sufficient strength for practical applications are those whose intrinsic viscosities [η] (as measured at 25° C. using orthochlorophenol as solvent) are at least 0.7, and preferably at least 0.8. However, the low molecular weight modified polybutylene terephthalates used in this invention are those whose intrinsic viscosities [η] range from 0.15 to 0.6.

The low molecular weight modified polybutylene terephthalate whose hydroxyl value is less than 5 is not suitable for use in this invention, because the melt viscosity of the resulting polymer becomes too high, with the consequence that there arises the necessity for a special manufacturing apparatus, such as hereinbefore described. In addition, it becomes difficult to achieve the desired high molecular weight, since the reaction with the polyfunctional isocyanate does not proceed fully. On the other hand, when the hydroxyl value exceeds 40, this also is undesirable, because when such a low molecular weight modified polybutylene terephthalate is used, there arises the necessity of increasing the amount of the polyfunctional isocyanate that is to be reacted, and the properties of the final polymer obtained decline.

The starting materials in synthesizing the low molecular weight modified polybutylene terephthalate are suitably mixed in the following proportions: i.e., in such amounts that the total molar quantity of the 1,4-butanediol and either the alkylene oxide adduct of 2 – 4 carbon atoms of tetrabromobisphenol A or the alkylene oxide adduct of 2 – 4 carbon atoms of tetrachlorobisphenol A, i.e., the alcohol component, is 1 – 2.5-fold that of the terephthalic acid or its lower alkyl ester of 1 – 4 carbon atoms, i.e., the acid component. The reason for this somewhat excess use of the alcohol component is for discharging the 1,4-butanediol externally of the system under reduced pressure at the time of the polycondensation reaction.

The amount of the alkylene oxide adduct of 2 – 4 carbon atoms of tetrabromobisphenol A or the alkylene oxide adduct of 2 – 4 carbon atoms of tetrachlorobisphenol A contained in the low molecular weight modified polybutylene tetraphthalate greatly influences the flame retardancy of the resulting polymer. When this amount is extremely great, the melting point, say, of the resulting polymer declines to make it unfit for molding purposes. On the other hand, when this amount is extremely small, the flame retardant effects are not fully demonstrated.

Preferred examples of the lower alkyl esters of 1 – 4 carbon atoms of terephthalic acid include the terephthalic acid diesters in which the lower alkyl of 1 – 4 carbon atoms is either methyl, ethyl, propyl or butyl.

On the other hand, examples of the alkylene oxide adduct of 2 – 4 carbon atoms of tetrabromobisphenol A or the alkylene oxide adduct of 2 – 4 carbon atoms of tetrachlorobisphenol A are those having the general formula

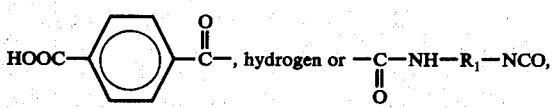

wherein X is Br or Cl, and R is either ethylene, propylene, isopropylene or butylene. While the terephthalic acid type compounds are used in this invention as the acid component, it is also possible to use conjointly the isophthalic acid type compounds, i.e., isophthalic acid and the diethyl esters thereof such as methyl, ethyl, propyl and butyl isophthalates, provided that these isophthalic acid type compounds are used in small amounts.

The flame retardant thermoplastic polyester obtained in accordance with this invention by reacting a low molecular weight modified polybutylene terephthalate with a polyfunctional isocyanate is represented by the following formula and has a number average molecular weight of 18,000 – 60,000.

$$A\{[(B)_m-(C)_n-(D)]_{1-p}(E)_q\}_r-F$$

wherein A and F are either

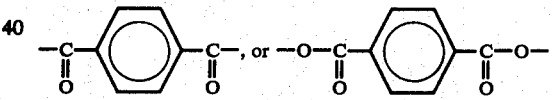

with the limitation that there is no direct linkage of A and F with the B and E components; B is

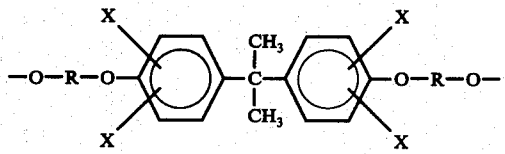

when it is situated at terminal ends of the polymer, with the limitation that there is no direct linkage of two B's and, moreover, there is no direct linkage of B with the A, E and F components; C is —O—C$_4$H$_8$—O—, with the limitation that there is no direct linkage of two C's and, moreover, there is no direct linkage of C with D; D is

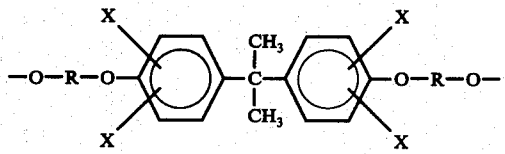

with the limitation that there is no direct linkage of two D's and, moreover, there is no direct linkage of D with C; E is

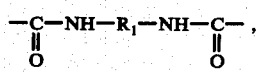

with the limitation that there is no direct linkage of two E's and, moreover, there is no direct linkage of E with the A, B and F components; $R_1$ is a divalent hydrocarbon radical of 2 – 15 carbon atoms; R is ethylene, propylene, isopropylene or butylene; X is Cl or Br and when X is Cl, $m$ is 3.62 – 52.2, $n$ is 0.510 – 51.0 and $l$ is 0.345 – 26.3, and when X is Br, $m$ is 5.86 – 53.8, $n$ is 4.82 – 53.7 and $l$ is 0.152 – 8.93; $p$ is 0.560 – 26.8; and $q$ is 0.280 – 25.8, with the proviso that when A or F is

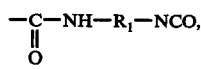

$q$ is a value inclusive of A and F.

While in the foregoing general formula for a flame retardant thermoplastic polyester the polyfunctional isocyanate is prepresented by a diisocyanate, if a small amount of a tri- or tetraisocyanate is added, there is formed to some extent a network or multidimensional structure, which is difficult to show by means of a general formula.

As hereinbefore indicated, the aforesaid flame retardant thermoplastic polyester is obtained by the reaction of a low molecular weight modified polybutylene terephthalate with a polyfunctional isocyanate. And in this case, the starting materials are mixed in such a proportion that (0.1 × 2.5) isocyanate equivalent of the polyfunctional isocyanate is used per hydroxyl equivalent of the low molecular weight modified polybutylene terephthalate. That is, the starting materials are mixed such that the number of the isocyanate groups of the polyfunctional isocyanate become 0.1 – 2.5 times, preferably 1.0 – 2.0 times, the number of the hydroxyl groups of the low molecular weight modified polybutylene terephthalate.

Further, since the low molecular weight modified polybutylene terephthalate is terminated by a carboxyl group having an acid value of not greater than 10, the flame retardant thermoplastic polyester usually consists of a mixture of the compound of the following formulas (I) and (II) or of a compound of the formula (II).

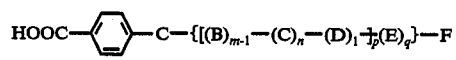
(I)

wherein F is either H or

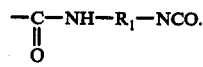

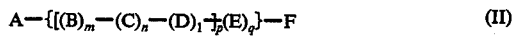
(II)

wherein A and F are either hydrogen or

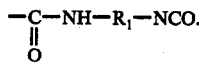

The polyfunctional isocyanate used in this invention are those having the general formula

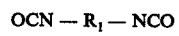

wherein $R_1$ is a divalent hydrocarbon radical of 2 – 15 carbon atoms. Specifically, most conveniently used are such aliphatic and aromatic diisocyanates as, for example, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, propane diisocyanate-1,2, butane diisocyane-1,2, pentane diisocyanate-1,2, pentane diisocyanate-1,3, hexane diisocyanate-1,3, hexane diisocyanate-1,4, hexane diisocyanate-1,5, 4-methylhexane diisocyanate-1,2, 3-methyl-hexane diisocyanate-1,4, 2-benzylpropane diisocyanate-1,3, 2,4-diphenylhexane diisocyanate-1,6, p-phenylene diisocyanate, m-phenylene diisocyanate, 4,4'-diphenyl diisocyanate, 1,4-naphthalene diisocyanate, 1,5-naphthylene diisocyanate, 1,8-naphthylene diisocyanate, 2,6-naphthylene diisocyanate, 1-methyl-phenylene diisocyanate-2,4, 1-methyl-phenylene diisocyanate-2,6,xylyene diisocyanate-1,3, xylylene diisocyanate-1,4, 4,4'-diisocyanate diphenyl ether, 2,2'-diisocyanate diethyl ether, 2,2'-diisocyanate diethyl sulfide, 4,4'-diisocyanate diphenylmethane and hydrogenated 4,4'-diisocyanate diphenylmethane. Likewise usable are such polyfunctional isocyanates as 1-methyl-phenylene diisocyanate-2,4-dimer and 1-methyl-phenylene diisocyanate-2,6-dimer. Again, the polyisocyanates having three or more isocyanate groups in their molecules such, for example, as triphenylmethane-4,4',4''-triisocyanate and the crude 4,4'-diisocyanate-diphenylmethane can also be used conjointly with the foregoing polyfunctional isocyanates.

The reaction between the low molecular weight modified polybutylene terephthalate and the polyfunctional isocyanate is carried out by known methods. For example, it is carried out using, say, a reaction vessel for high viscosity resin use, a kneader or an extruder. However, especially convenient is the use of an extruder when considered from the standpoint of productivity. The reaction is usually carried out at a temperature of 180° – 300° C. for a period of 0.2 – 10 minutes.

The flame retardant thermoplastic polyester of this invention can contain such reinforcing agents as glass fibers as well as such fillers as talc, clay, etc., or such other additives as crystal nucleating agents, pigments, dyestuffs, plasticizers, mold releasing agents, etc. The addition of glass fibers is especially desirable, since various advantages are had in that there is a marked improvement in such physical properties as mechanical properties, heat resistance and dimensional stability as well as a decrease of molding shrinkage.

Glass fibers treated with the known coupling agents, preferably a silane type coupling agent, are convenient. Both the chopped strand glass and roving glass of a length of 1 – 30 mm can be used. The glass fibers are suitably contained in an amount of 5 – 15% by weight of the composition.

The glass fibers are preferably added either prior to the time the low molecular weight modified polybutylene terephthalate is converted to a high polymer with the polyfunctional isocyanate or at the same time. However, they may be also mixed in with the resulting polymer after completion of the reaction.

Further, a more preferable practice is to add an epoxy compound at the same time the addition of the glass fibers is made, since this improves the adherence between the flame retardant thermoplastic polyester and the glass fibers, with the consequence that the physical properties of the resulting composition are improved. As the epoxy compounds to be used in this case, there can be mentioned the epoxy compounds of the glycidyl ether of bisphenol A type that are commercially available under the trade name of EPIKOTE 828, EPIKOTE 1001, EPIKOTE 1004, EPIKOTE 1007 and EPIKOTE 1009 (all products of Shell Company), and EPICLON 800, EPICLON 1050, EPICLON 3010 and EPICLON 4050 (all products of Dainippon Ink & Chemicals, Ltd.); the epoxy compounds of the glycidyl ether type derived from pyrocatechol, nucleus-substituted pyrocatechol, resorcinol, nucleus-substituted resorcinol, bis(hydroxyphenyl) methane, nucleus-substituted bis(hydroxyphenyl)methane, dihydric phenols of the general formula

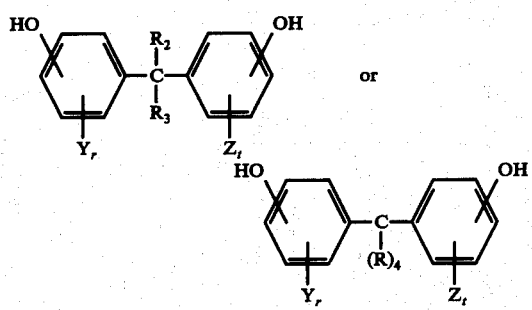

where $R_2$ and $R_3$ are each a different atom or group selected from the group consisting of the hydrogen atom and the alkyl, aryl and alkylaryl groups, $R_4$ is an alkylene or alkenylene group, Y and Z are each at least one atom or group selected from the group consisting of the alkyl and alkoxy groups and halogen atoms, and $r$ and $t$ are integers from 1 to 4; dihydroxynaphthalene and dihydroxy anthracene; epoxy compounds of the glycidyl ether of novolak type such as EPIKOTE 154 (a product of Shell Company); epoxy compounds of the glycidyl ether type derived from tetrahydroxyphenylmethane, polyalcohols, polyglycols, etc.; and the epoxy compounds of the glycidyl ester type commercially available under the trade names of EPICLON 200, EPICLON 400 (both products of Dainippon Ink & Chemicals, Ltd.), etc. Preferred of these epoxy compounds are those whose epoxy equivalency is in the range of 170 - 1600. Most preferred are the epoxy compounds of the glycidyl ether of bisphenol A type. These epoxy compounds are added in an amount of 0.1 - 5% by weight, and preferably 0.2 - 2% by weight, of the resulting composition.

The flame retardant effects of the flame retardant thermoplastic polyester of this invention are influenced by the amount of the alkylene oxide adduct of 2 - 4 carbon atoms of tetrabromobisphenol A or the alkylene oxide adduct of 2 - 4 carbon atoms of tetrachlorobisphenol A incorporated in the skeleton of the polymer. In proportion as the amount of halogen in the polymer increases, the flame retardant effects become greater, but the physical properties of the resulting resin suffer. On the other hand, when the amount of halogen becomes less, an adequate flame retardance is not imparted. The amount of halogen should be usually 2 - 20% by weight, and preferably 3 - 12% by weight, of the total weight of the resulting polymer.

When an admixture of a metal-containing compound is made as a flame retarding assistant, it is possible to achieve a still greater increase in the flame retardant effects of the resulting resin. As these metal-containing compounds, there can be mentioned the oxides and hydroxides of such metal as, for example, antimony, bismuth, arsenic, phosphorus, boron, aluminum, zirconium, etc. Preferred are such compounds as antimony trioxide, boron hydroxide and zirconium dioxide. Asbestos is likewise usable. These compounds are incorporated in an amount of 0.5 - 20% by weight, and preferably 1 - 10% by weight, of the total weight of the resulting polymer.

The thus obtained flame retardant thermoplastic polyester of this invention can be used for various purposes but is especially useful as a molding material.

The following example will serve to more fully illustrate the present invention. In the examples the parts are on a weight basis.

EXAMPLE 1

544 Parts of tetrabromobisphenol A, 92 parts of ethylene oxide, 272 parts of toluene and 3 parts of caustic soda were charged to an autoclave, after which the autoclave was closed and the reaction was carried out for 6 hours at 120° C. After completion of the reaction, the reaction system was neutralized with phosphoric acid and washed with water. Toluene was then removed, and the reaction product was purified to obtain 2,2-bis[4-(2-hydroxyethoxy)-2,6-dibromophenyl]propane (i.e. an ethylene oxide adduct of tetrabromobisphenol A) having a melting point of 102° C.

A mixture of 100 parts of dimethyl terephthalate, 56 parts of 1,4-butanediol and 25 parts of the ethylene oxide adduct of tetrabromobisphenol A synthesized hereinabove was dissolved by heating at 130° C. followed by the addition of 0.02 part of tetraisopropyl titanate as catalyst. The ester interchange reaction was initiated, and methanol was formed as a by-product. The temperature of the system was then gradually raised, and at a point where the distillation of the methanol practically ceased the condensation reaction was carried out at a temperature of 240° C. by reducing the pressure to about 10 mm Hg. Three hours after initiating the reduction of pressure, the system was returned to normal atmospheric pressure, and the resin formed was withdrawn. The so obtained low molecular weight modified polybutylene terephthalate had a hydroxyl value of 14, an acid value of 2, a [η] of 0.35 and an average molecular weight of 7000.

100 Parts of this low molecular weight modified polybutylene terephthalate, 5.4 parts of diphenylmethane-4,4'-diisocyanate and 8 parts of antimony trioxide were placed in a stirrer-equipped reaction vessel heated at 240° C. and stirred for 10 minutes under a stream of nitrogen. The resulting flame retardant thermoplastic polyester (I-A) ahd a number average molecular weight of 25,000, a hydroxyl value of 2.5 and an acid value of 2. After comminuting this resin into granular form, it was injection molded into test pieces. The several tests for tensil strength (TS), flexural strength (FS), notched Izod impact strength (IS) and flame retardance were carried out, with the results shown in Table 1. The several tests in the case of this and subsequent examples were conducted in accordance with the following methods.

| Tensile strength | ASTM-D-638 |
| Flexural strength | ASTM-D-790 |
| Impact strength | ASTM-D-256 |
| Flame retardancy | Underwriters' Laboratories, Inc. Subject 94 (UL 94) |

Again, 100 parts of the aforesaid low molecular weight modified polybutylene terephthalate, 5.4 parts of flaky diphenylmethane-4,4'-diisocyanate and 8 parts of antimony trioxide were mixed for 10 minutes in a tumbler, to which was then added 50 parts of 6-mm-long chopped glass fibers that had been treated with an aminosilane type coupling agent, followed by mixing for a further 50 seconds. This mixture was then fed to a vent-equipped 65-mm extruder provided with a full flight-type screw, the temperature of whose barrel was set at 250° C. to prepare pellets of a flame retardant thermoplastic polyester (I-B) at such an extrusion speed that the dwell time of the starting material in the barrel would be 2 minutes. The number average molecular weight of the polymer was the same as that indicated above. Test pieces were prepared by injection molding these pellets, following which the test pieces were submitted to the several tests described hereinbefore, with the results shown in Table 1.

Again, 100 parts of the low molecular weight modified polybutylene terephthalate, 5 parts of flaky diphenylmethane-4,4'-diisocyanate, 5 parts of antimony trioxide and 2 parts of EPIKOTE 1001 (a powdery epoxy compound of the glycidyl ether of bisphenol A type, epoxy equivalency 450, a product of Shell Company) were mixed for 10 minutes in a tumbler, to which was then added 50 parts of 6-mm-long chopped glass fibers which had been treated with an aminosilane type coupling agent, followed by mixing for a further 50 seconds. This mixture was fed to a vent-equipped 65-mm extruder provided with a full flight-type screw, the temperature of whose barrel was set at 250° C. to prepare pellets of a flame retardant thermoplastic polyester (I-C) at such an extrusion speed that the dwell time of the starting material in the barrel would be 2 minutes. The number average molecular weight of the polymer was the same as that of the foregoing flame retardant thermoplastic polyester (I-B). 1.6-mm-thick test pieces were prepared by injection molding these pellets. These test pieces were used, and the hereinbefore-described several tests were conducted, with the results shown in Table 1.

CONTROL 1

A low molecular weight polybutylene terephthalate was synthesized as in Example 1 using 100 parts of dimethyl terephthalate and 56 parts of 1,4-butanediol as the starting materials. This low molecular weight polybutylene terephthalate had a hydroxyl value of 14, an acid value of 2 and a number average molecular weight of 7000. Except that this low molecular weight polybutylene terephthalate was used instead of the low molecular weight modified polybutylene terephthalate used in Example 1 and that antimony trioxide was not added, the synthesis of a thermoplastic polyester (I-A') was otherwise carried out under identical conditions as in the case with the synthesis of the flame retardant thermoplastic polyester in Example 1. Similar tests as in the case of Example 1 were conducted on the resulting polyester. The results obtained were shown in Table 1.

Further, except that the foregoing low molecular weight polybutylene terephthalate was used instead of the low molecular weight modified polybutylene terephthalate used in Example 1 and that antimony trioxide was not added, the synthesis of a thermoplastic polyester (I-B') was otherwise performed under identical conditions as in the case with the synthesis of the flame retardant thermoplastic polyester in Example 1. The resulting polyester was tested as in Example 1, with the results shown in Table 1.

EXAMPLE 2

Tetrachlorobisphenol A was used instead of tetrabromobisphenol A, but by operating otherwise as in Example 1 an ethylene oxide adduct of tetrachlorobisphenol A was synthesized, after which the synthesis of a low molecular weight modified polybutylene terephthalate was carried out as in Example 1. This low molecular weight modified polybutylene terephthalate had a hydroxyl value of 12, an acid value of 3 and a number average molecular weight of 7460.

One hundred parts of the so obtained low molecular weight modified polybutylene terephthalate, 5 parts of flaky diphenylmethane-4,4'-diisocyanate and 4 parts of antimony trioxide were reacted as in Example 1 to obtain a flame retardant thermoplastic polyester (II-A). The so obtained polyester had a number average molecular weight of 30,000. This polyester was tested as in Example 1, with the results shown in Table 1.

Again, 100 parts of the foregoing low molecular weight modified polybutylene terephthalate, 5 parts of flaky diphenylmethane-4,4'-diisocyanate, 4 parts of antimony trioxide and 50 parts of 6-mm-long chopped glass fibers which had been treated with a vinylsilane type coupling agent were mixed as in Example 1 and thereafter processed in an extruder to obtain pellets of a flame retardant thermoplastic polyester (II-B). The so obtained polyester had a hydroxyl value of 0.9, an acid value of 3 and a number average molecular weight of 29,000. This polyester was submitted to the same tests as in Example 1, with the results shown in Table 1.

Further, 100 parts of the foregoing low molecular weight modified polybutylene terephthalate, 5 parts of flaky diphenylmethane-4,4'-diisocyanate, 4 parts of antimony trioxide and 3 parts of EPIKOTE 828 (an epoxy compound of the glycidyl ether of bisphenol A type, epoxy equivalency 190, a product of Shell Company) were mixed for 10 minutes in a tumbler, to which was then added 50 parts of 6-mm-long chopped glass fibers which had been treated with a vinylsilane type coupling agent. The so obtained mixture was used, and by operating as in the case of the preparation of the flame retardant thermoplastic polyester (I-C) in Example 1 pellets of a flame retardant thermoplastic polyester (II-C) were prepared. This polyester was then tested as in Example 1, with the results shown in Table 1.

EXAMPLE 3

1,2-propylene oxide was used instead of ethylene oxide, and by operating as in Example 1 a 1,2-propylene oxide adduct of tetrabromobisphenol A was synthesized. Next, this adduct was used and a low molecular weight modified polybutylene terephthalate was synthesized as in Example 1. This low molecular weight modified polybutylene terephthalate had a hydroxyl value of 19, an acid value of 1 and a number average molecular weight of 5600.

One hundred parts of this low molecular weight modified polybutylene terephthalate, 6 parts of flaky diphenylmethane-4,4'-diisocyanate and 12 parts of antimony trioxide were reacted as in Example 1 to obtain a flame retardant thermoplastic polyester (III-A). The so obtained polyester had a hydroxyl value of 3.5, and acid value of 1 and a number average molecular weight of 25,000. This polyester was tested with the results shown in Table 1.

Again, 100 parts of the foregoing low molecular weight modified polybutylene terephthalate, 6 parts of flaky diphenylmethane-4,4'-diisocyanate, 12 parts of antimony trioxide and 50 parts of 6-mm-long chopped glass fibers treated with an aminosilane type coupling agent were mixed as in Example 1 and thereafter processed in an extruder to obtain pellets of a flame retardant thermoplastic polyester (III-B). The number average molecular weight of this polymer was 26,000. The physical properties of the polymer were shown in Table 1.

Further, a mixture consisting of 100 parts of the foregoing low molecular weight modified polybutylene terephthalate, 5 parts of flaky diphenylmethane-4,4'-diisocyanate, 4 parts of antimony trioxide, 1.0 part of EPIKOTE 154 (an epoxy compound of the glycidyl ether of novolak type, epoxy equivalency 180, a product of Shell Company) and 50 parts of 6-mm-long chopped glass fibers treated with an aminosilane type coupling agent was used to prepare pellets of a flame retardant thermoplastic polyester (III-C) by operating as in the case of the preparation of the pellets of flame retardant thermoplastic polyester (I-C) in Example 1. The so obtained pellets were tested in similar manner with the results shown in Table 1.

EXAMPLE 4

A low molecular weight modified polybutylene terephthalate (hydroxyl value 11, acid value 0, number average molecular weight 10,180) was synthesized from 15 parts of the ethylene oxide adduct of tetrabromobisphenol A synthesized in Example 1, 100 parts of dimethyl terephthalate and 56 parts of 1,4-butanediol.

One hundred parts of this low molecular weight modified polybutylene terephthalate, 6 parts of flaky diphenylmethane-4,4'-diisocyanate and 12 parts of antimony trioxide were used, and by operating as in the case of the flame retardant thermoplastic polyester of Example 1 a flame retardant thermoplastic polyester (IV-A) was obtained. The so obtained polymer had a hydroxyl value of 2.8, an acid value of 0 and a number average molecular weight of 40,000. This polymer was tested with the results shown in Table 1.

Again, 100 parts of the foregoing low molecular weight modified polybutylene terephthalate, 4 parts of flaky diphenylmethane-4,4'-diisocyanate, 10 parts of boron hydroxide and 50 parts of 6-mm-long chopped glass fibers treated with an aminosilane type coupling agent were used, and by operating as in Example 1 pellets of a flame retardant thermoplastic polyester (IV-B) were obtained. The number average molecular weight of this polymer was 41,000. This polymer was tested with the results shown in Table 1.

Table 1

| Flame Retardant Thermoplastic Polyester | | TS (kg/cm²) | FS (kg/cm²) | IS (kg . cm/cm) | Flame Retardancy (UL 94)* |
|---|---|---|---|---|---|
| Example 1 | I-A | 550 | 850 | 2 | V-0 |
|  | I-B | 1200 | 1700 | 8 | V-0 |
|  | I-C | 1400 | 2000 | 12 | V-0 |
| Control 1 | I-A' | 600 | 900 | 3 | Burns with a flame |
|  | I-B' | 1300 | 1800 | 9 | " |
| Example 2 | II-A | 650 | 900 | 3 | V-1 |
|  | II-B | 1150 | 1650 | 7 | V-1 |
|  | II-C | 1350 | 1900 | 10 | V-1 |
| Example 3 | III-A | 500 | 800 | 3 | V-0 |
|  | III-B | 1100 | 1600 | 7 | V-0 |
|  | III-C | 1300 | 1850 | 9 | V-0 |
| Example 4 | IV-A | 750 | 1000 | 5 | V-0 |
|  | IV-B | 1300 | 1800 | 8 | V-2 |

*A 1.6 mm-thick test piece was used.

What is claimed is:

1. A process for preparing a flame retardant thermoplastic polyester molding resin which comprises reacting in the presence of a reinforcing agent a low molecular weight polyester having terminal hydroxyl groups with a polyfunctional isocyanate, said low molecular weight polyester being one synthesized using as its acid component a compound selected from the group consisting of terephthalic acid and its lower alkyl esters of 1–4 carbon atoms and as its alcohol component 1,4-butanediol and a compound selected from the group consisting of an alkylene oxide adduct of 2–4 carbon atoms of tetrabromobisphenol A and an alkylene oxide adduct of 2–4 carbon atoms of tetrachlorobisphenol A.

2. The process of claim 1 wherein the polyfunctional isocyanate is a diisocyanate having the general formula $$OCN - R_1 - NCO$$

wherein $R_1$ is a divalent hydrocarbon radical of 2 – 15 carbon atoms.

3. The process of claim 1 wherein said low molecular weight polyester and said polyfunctional isocyanate are mixed in such a proportion that the ratio of the number of isocyanate groups of the polyfunctional isocyanate to the number of hydroxyl groups of the low molecular weight polyester is 1:0.1 – 2.5.

4. The process of claim 1 wherein said low molecular weight polyester is one that has been obtained by reacting an acid component and an alcohol component in a mole ratio of 1:1 – 2.5.

5. A molding resin obtained by the process of claim 1.

6. The process of claim 1 wherein the reinforcing agent comprises glass fibers.

7. The process of claim 1 wherein said low molecular weight polyester is a random copolyester having the general formula

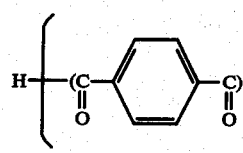  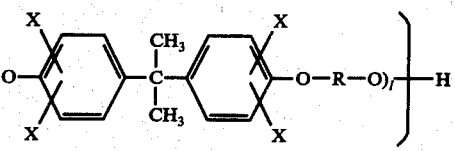

wherein

R is a member selected from the group consisting of ethylene, propylene, isopropylene and butylene; X is a member of the group consisting of Cl and Br, with the proviso that when X is Cl, $m$ is a number from 3.62 to 52.2, $n$ is a number from 0.510 to 51.0, and $l$ is a number from 0.345 to 26.3, and when X is Br, $m$ is a number from 5.86 to 53.8, $n$ is a number from 4.82 to 53.7 and $l$ is a number from 0.152 to 8.93.

8. The process of claim 7 wherein the low molecular weight polyester has an intrinsic viscosity as measured at 25° C using orthochlorophenol as solvent in the range of from 0.15 to 0.6, a hydroxyl value which is not less than 5 or more than 40 and an acid value which is not greater than 10 and is not greater than 1/3 of the hydroxyl value and a number average molecular weight of 2240 –14000.

9. A reinforced flame retardant thermoplastic polyester molding resin composition comprising
A. a flame retardant thermoplastic polyester which is the reaction product of a low molecular weight modified polybutylene terephthalate with a polyfunctional isocyanate, said reaction product having a number average molecular weight of 18000–60000 and being a random copolyester represented by the following formula:

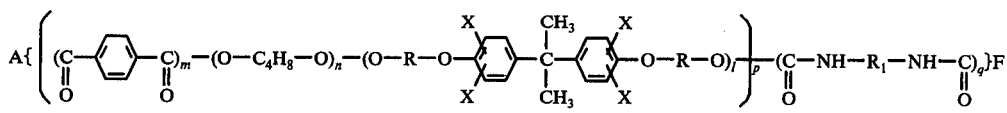

wherein A and F are either

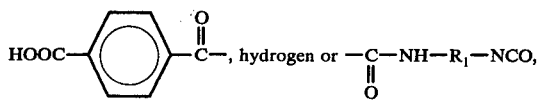

$R_1$ is a divalent hydrocarbon radical of 2–15 carbon atoms; R is ethylene, propylene, isopropylene or butylene; X is Cl or Br and when X is Cl $m$ is 3.62–52.2, $n$ is 0.510–51.0, and $l$ is 0.345 –26.3, and when X is Br, $m$ is 5.86–53.8, $n$ is 4.82–53.7 and $l$ is 0.152–8.93; $p$ is 0.560 –26.8; and $q$ is 0.280–25.8, with the proviso that when A or F is $q$ is a value inclusive of A and F; and,
B. from 5–50% by weight of the composition of glass fiber reinforcing agent, said glass fibers being present during the reaction forming the reaction product of (A).

10. The composition of claim 9 which further comprises an epoxy compound having an epoxy equivalency in the range of 170–1600, in an amount of 0.1–5% by weight of the composition.

11. The composition of claim 10 wherein the epoxy is a glycidyl ether of bisphenol A.

12. The composition of claim 9 in which the amount of halogen is from 2–20% by weight based on the total weight of the flame retardant thermoplastic polyester (A).

* * * * *

UNITED STATES PATENT OFFICE
CERTIFICATE OF CORRECTION

PATENT NO. : 4,085,086

DATED : April 18, 1978

INVENTOR(S) : Shioji Mizuno et at.

It is certified that error appears in the above-identified patent and that said Letters Patent are hereby corrected as shown below:

Claim 9, column 14, line 13, after "A or F is" insert--

$-\underset{\underset{O}{\|}}{C}-NH-R_1-NCO,$ --

Claim 9, column 14, line 8, before "m" insert--,--

Signed and Sealed this

Tenth Day of October 1978

[SEAL]

Attest:

RUTH C. MASON
Attesting Officer

DONALD W. BANNER
Commissioner of Patents and Trademarks